United States Patent
Bacos et al.

(10) Patent No.: US 10,267,151 B2
(45) Date of Patent: Apr. 23, 2019

(54) METHOD FOR LOCALLY REPAIRING THERMAL BARRIERS

(71) Applicant: OFFICE NATIONAL D'ETUDES ET DE RECHERCHES AÉROSPATIALES (ONERA), Palaiseau (FR)

(72) Inventors: Marie-Pierre Bacos, Antony (FR); Odile Lavigne, Paris (FR); Catherine Rio, Limours (FR); Marie-Helene Vidal-Setif, Le Plessis Robinson (FR); Frederic Rousseau, Esclavolles Lurey (FR); Daniel Morvan, Paris (FR)

(73) Assignee: Office National D'Etudes et de Recherches Aerospatiales, Palaiseau (FR)

( * ) Notice: Subject to any disclaimer, the term of this patent is extended or adjusted under 35 U.S.C. 154(b) by 240 days.

(21) Appl. No.: 15/101,023

(22) PCT Filed: Dec. 1, 2014

(86) PCT No.: PCT/FR2014/053101
§ 371 (c)(1),
(2) Date: Jun. 2, 2016

(87) PCT Pub. No.: WO2015/082818
PCT Pub. Date: Jun. 11, 2015

(65) Prior Publication Data
US 2017/0044901 A1    Feb. 16, 2017

(30) Foreign Application Priority Data
Dec. 2, 2013  (FR) ..................... 13 61944

(51) Int. Cl.
*C23C 4/01*     (2016.01)
*F01D 5/00*    (2006.01)
(Continued)

(52) U.S. Cl.
CPC ............... *F01D 5/005* (2013.01); *C23C 4/01* (2016.01); *C23C 4/02* (2013.01); *C23C 4/06* (2013.01);
(Continued)

(58) Field of Classification Search
None
See application file for complete search history.

(56) References Cited

U.S. PATENT DOCUMENTS 4,402,992 A    9/1983  Liebert
4,743,462 A    5/1988  Radzavich et al.
(Continued)

FOREIGN PATENT DOCUMENTS

FR    2 729 400           7/1996
WO    WO 2015/082819 A1   6/2015

OTHER PUBLICATIONS

Rousseau F. et al., "Deposition of thick and 50% porous YpSZ layer by spraying nitrate solution in a low pressure plasma reactor", Surface & Coatings Technology, vol. 206, No. 7, Jun. 29, 2011, pp. 1621-1627.
(Continued)

*Primary Examiner* — Joel G Horning
(74) *Attorney, Agent, or Firm* — Dority & Manning, P.A.

(57) ABSTRACT

The invention relates to a method for repairing a thermal barrier of a component comprising a substrate coated with such a thermal barrier, said substrate being made of a high-performance alloy, said thermal barrier being adhered to the alloy and having lower thermal conductivity than the alloy, the thermal barrier including at least one ceramic, one region of the thermal barrier being a region to be repaired, wherein said method includes the following steps: a) defining the region to be repaired, using a mask which protects the other regions of the thermal barrier; b) injecting a carrier
(Continued)

gas loaded with droplets of ceramic precursor into a plasma discharge inside a plasma chamber of a plasma reactor containing the component to be repaired, while making the concentration of ceramic precursor in the carrier gas dependent on at least one parameter of the reactor selected from among: the pressure of the plasma chamber, the power of the plasma generator and the diameter of the precursor droplets, in order to control the state—liquid, gel or solid—of the ceramic precursor having an effect on the region to be repaired; c) injecting a gas not loaded with ceramic precursor into a plasma discharge within the plasma chamber, steps b) and c) being repeated.

16 Claims, 3 Drawing Sheets

(51) Int. Cl.
    *C23C 4/02* (2006.01)
    *C23C 4/11* (2016.01)
    *C23C 4/134* (2016.01)
    *C23C 4/06* (2016.01)
    *F01D 5/28* (2006.01)
    *F23R 3/00* (2006.01)

(52) U.S. Cl.
    CPC ............ *C23C 4/11* (2016.01); *C23C 4/134* (2016.01); *F01D 5/28* (2013.01); *F23R 3/002* (2013.01); *F05D 2220/32* (2013.01); *F05D 2230/80* (2013.01); *F05D 2230/90* (2013.01); *F05D 2300/502* (2013.01); *F05D 2300/611* (2013.01); *Y02T 50/671* (2013.01)

(56) References Cited

U.S. PATENT DOCUMENTS

| | | | |
|---|---|---|---|
| 5,216,808 A | | 6/1993 | Martus et al. |
| 5,399,388 A | | 3/1995 | Aklufi |
| 5,538,796 A | | 7/1996 | Schaffer et al. |
| 5,565,035 A | | 10/1996 | Sylvestro et al. |
| 5,585,136 A | | 12/1996 | Barrow et al. |
| 5,603,771 A | | 2/1997 | Seiberras et al. |
| 5,702,288 A | | 12/1997 | Liebke et al. |
| 5,723,078 A | | 3/1998 | Nagaraj et al. |
| 5,775,108 A | | 7/1998 | Ansart et al. |
| 5,800,695 A | | 9/1998 | Kang et al. |
| 5,846,605 A | * | 12/1998 | Rickerby |
| 5,985,122 A | | 11/1999 | Conner |
| 6,004,620 A | | 12/1999 | Camm |
| 6,025,034 A | | 2/2000 | Strutt et al. |
| 6,032,361 A | | 3/2000 | Makino et al. |
| 6,126,396 A | | 10/2000 | Doughty et al. |
| 6,183,811 B1 | | 2/2001 | Conner |
| 6,210,488 B1 | | 4/2001 | Bruce |
| 6,235,352 B1 | | 5/2001 | Leverant et al. |
| 6,258,226 B1 | | 7/2001 | Conner |
| 6,365,013 B1 | | 4/2002 | Beele |
| 6,408,610 B1 | | 6/2002 | Caldwell et al. |
| 6,579,573 B2 | | 6/2003 | Strutt et al. |
| 6,875,464 B2 | | 4/2005 | Ruud et al. |
| 7,008,522 B2 | | 3/2006 | Boucard et al. |
| 7,093,993 B2 | | 8/2006 | Skoog et al. |
| 7,094,450 B2 | | 8/2006 | Nagaraj et al. |
| 7,115,832 B1 | | 10/2006 | Blankenship et al. |
| 7,273,662 B2 | | 9/2007 | Gleeson et al. |
| 7,476,703 B2 | | 1/2009 | Ruud et al. |
| 7,482,039 B2 | | 1/2009 | Bacos et al. |
| 7,588,797 B2 | | 9/2009 | Skoog et al. |
| 7,670,112 B2 | | 3/2010 | Boury et al. |
| 7,842,335 B2 | | 11/2010 | Skoog et al. |
| 8,221,825 B2 | | 6/2012 | Reitz et al. |
| 2004/0258611 A1 | | 12/2004 | Barrow et al. |
| 2005/0003097 A1 | | 1/2005 | Philip et al. |
| 2005/0035085 A1 | * | 2/2005 | Stowell ............... B08B 7/0035 216/76 |
| 2005/0129868 A1 | | 6/2005 | Philip et al. |
| 2007/0160859 A1 | | 7/2007 | Darolia et al. |
| 2007/0202269 A1 | | 8/2007 | Potter et al. |
| 2011/0287191 A1 | | 11/2011 | Martin et al. |

OTHER PUBLICATIONS

International Search Report for PCT/FR2014/053101, dated Mar. 26, 2015, 3 pages.
Abstract of WO 2011/144860, dated Nov. 24, 2011.
Fourmond, "Synthèse d'oxydes par plasma. Mise au point d'un récteur plasma pour les tests de résistance au CMAS." ["Synthesis of oxides by plasma. Development of a plasma reactor for strength tests at CMAS"] Doctoral thesis from the Université Pierre et Marie Curie defended on Nov. 29, 2011.
L. Pin et al., "Processing, repairing and cycling oxidation behaviour of sol-gel thermal barrier coating", Surface and Coating Technology, vol. 26, No. 7, Jun. 29, 2011, pp. 1609-1614.
M. Gell. et al., "Highly durable thermal barrier coatings made by the solution precursor plasma spray process", Surface and Coating Technology, vol. 177-178, Jan. 2004, pp. 97-102.
Padture, et al., "Toward durable thermal barrier coatings with novel microstructure deposited by solution-precursor plasma spray", Acta Materialia, vol. 40, No. 12, Jul. 17, 2001, pp. 2251-2257.
S. Angel et al., Open Porous Metallic Foams With Thermal Barrier Coatings and Cooling Hole Array For High Temperature Turbine Applications; *High Temperature Material Processes*, vol. 11, issue 3, Nov. 11, 2007, pp. 321-343.
S. Kramer, et al., "Infiltration-Inhibiting Reaction of Gadolinium Zirconate Thermal Barrier Coatings with CMAS Melts," Journal of the American Ceramic Society, vol. 91, No. 2, Dec. 7, 2007, pp. 576-583.

* cited by examiner

METHOD FOR LOCALLY REPAIRING THERMAL BARRIERS

CROSS REFERENCE TO RELATED APPLICATION

This application is the national stage entry of International Patent Application No. PCT/FR2014/053101 having a filing date of Dec. 1, 2014, which claims priority to and the benefit of French Patent Application No. 1361944 filed in the French Intellectual Property Office on Dec. 2, 2013, the entire contents of which are incorporated herein by reference.

The invention relates to a method for locally repairing components comprising a substrate coated with a thermal barrier such as the blades of distributors, the rotor blades of high-pressure turbines of turbo-engines, notably for aviation, and combustion chambers.

Improvement of the efficiency of turbo-engines, notably in the aeronautics field, has led to an increase in the temperature of the gases leaving the combustion chamber and going to the turbine. Components have been adapted to this increase in temperature through the development of new alloys for the substrates, in particular the nickel-based single-crystalline superalloys, the employment of cooling systems by injection of gas passing through the component, and the deposition of ceramics as thermal insulator, called a thermal barrier. This thermal barrier creates, for a permanently cooled component, a temperature gradient that may be up to 200° C. for a thermal barrier about 150 µm thick. The qualities required for a thermal barrier are low thermal conductivity, strong adhesion to the substrate when the component is in service, and permanence of this adhesion, notably during the harsh thermal cycles to which the component is subjected.

In order to meet these requirements, a thermal barrier underlayer and a protective oxide are generally placed between the superalloy substrate and the thermal barrier. The underlayer may be of alloy of composition MCrAlY, in particular with M denoting iron, cobalt and/or nickel, or of nickel aluminide, simple or modified with a platinum metal or doped with a reactive element, for example zirconium, hafnium or yttrium, or else a diffused platinum deposit. The thermal barrier underlayer makes it possible to adapt the differences in coefficient of expansion between the superalloy and the thermal barrier. The underlayer is also able to protect the superalloy against oxidation, as the thermal barrier is porous. By interacting with oxygen, the underlayer creates a protective growth oxide, typically of alumina, called TGO for "Thermal Growth Oxide". The layer of TGO oxide begins to grow during the process of deposition of the thermal barrier and serves as adhesive for fixing the thermal barrier on the superalloy.

The thermal barriers can be deposited on the substrate to be coated either by a spraying technique, for example thermal spraying APS "Air Plasma Spray" or LPPS for "Low Pressure Plasma Spray" or HVOF for "High Velocity Oxy Fuel", or by physical vapor phase deposition, i.e. by evaporation, for example by EB-PVD for "Electron Beam-Physical Vapor Deposition".

Alternative techniques have also been published such as the processes SCP for "Spray Conversion Processing" or SPPS for "Solution Precursor Plasma Spray" described in U.S. Pat. No. 6,025,034, US2003/0077398, Padture et al. "Toward durable thermal barrier coatings with novel microstructures deposited by solution-precursor plasma spray" Acta Materialia (2001) 2251-2257 and M. Gell et al. "Highly durable thermal barrier coatings made by the solution precursor plasma spray process" Surface and Coating technology 177-178 (2004) 97-102 and which consist of injecting the particles in the form of salts in the liquid state into the flame of a high-power plasma torch (35-45 kW) in order to convert them to solid oxide and then melt them in the plasma torch and spray them in the form of molten oxide. Other techniques for producing thick oxide ceramics or thermal barriers exist, such as chemical vapor deposition known by the acronym CVD or plasma-assisted, known by the acronym PE-CVD for "Plasma Enhanced Chemical Vapor Deposition", cf. FR 2 695 944, the sol-gel route published in U.S. Pat. No. 5,585,136 or the process using a low-pressure plasma reactor in the article by Rousseau et al. "Deposition of thick and 50% porous YpSZ layer by spraying nitrate solution in a low pressure plasma reactor", Surface and Coating Technology 206 (7) (2011) 1621-1627.

A deposit obtained by thermal spraying generally has a lamellar structure, which may be altered by the presence of unmelted residues. The SPPS and SCP techniques allow a less pronounced lamellar structure to be obtained, with microporosity and nanoporosity of the deposit. The morphology of the thermal barriers obtained by thermal spraying promotes multiple crack formation and spalling within the ceramic following a crack parallel to the underlayer/ceramic interface.

A deposit obtained by EB-PVD has a structure of the columnar type that allows better adaptation of the mechanical and thermal stresses and is generally preferred for applications at high temperatures such as turbine blades, where the damage is concentrated at the level of the layer of alumina at the underlayer/ceramic interface.

The applicant was particularly interested in thermal barriers deposited on the basis of zirconia, notably yttria-doped zirconia, cerium oxide, or magnesia. In operation, thermal barriers may be damaged under the action of contaminants, notably sand, dusts, sediments, volcanic ash, present in the environment of the engine and which decompose under the effect of the temperature and the oxidizing atmosphere, and form liquid or semiliquid compounds on the surface of the thermal barrier. These compounds, typically consisting of oxides of calcium, magnesium, aluminum and silicon, are denoted by the general term CMAS. These undesirable compounds may also contain other oxides such as metal oxides, for example of iron, of titanium or of nickel, or alkali-metal oxides, for example $Na_2O$ or $K_2O$. Owing to their low viscosity, during engine operation the molten CMAS infiltrate the porosity of the thermal barrier (pores proper, cracks, inter-columnar spaces) and solidify on cooling, leading to the appearance of delamination cracks in the infiltrated thermal barrier, which may eventually lead to spalling. Moreover, there may be dissolution of the thermal barrier in the molten CMAS, which leads to degradation and alteration of the morphology and structure of the thermal barrier in contact with the CMAS. US 2007/0160859 describes the composition of anti-CMAS layers based on zirconia doped with various oxides of rare earths or based on compounds of the type $X_2Zr_2O_7$, X being a rare earth. Generally the anti-CMAS layer considered to be the most effective is that described by S. Kramer, J. Yang and C. Levi, in J. Am. Ceram. Soc. 91 [2] 576-583, (2008) and is based on gadolinium zirconate $Gd_2Zr_2O_7$.

Although progress has been made for limiting the cracking and spalling of these thermal barriers, the applicant has identified a crucial need to be able to locally repair damage thereof. In fact spalling may occur either just after deposition of the thermal barrier on the component as a result of mechanical or thermal shock, or later in service. In the latter case, generally spalling is located in the zones with the highest thermal and mechanical stresses, for example the top of the blades, which may come into contact with the casing, or the leading edge, which is the site of impacts of particles or debris. In the case of impacts or surface delamination of the thermal barrier and/or of the anti-CMAS layer, repair will be applied only to these two layers, with reconstruction of the thermal barrier and/or of its anti-CMAS layer, as appropriate. In the case of spalling of a portion of the thermal barrier as a result of thermal and/or mechanical stresses, local repair will take place on an underlayer that has been made bare, possibly oxidized, with presence of cracks at the underlayer/thermal barrier interface, which one aim to restore so that there is again adhesion between the thermal barrier and its anti-CMAS layer.

To repair thermal barriers, the current state of the art recommends completely removing the thermal barrier and its underlayer. Such an operation begins with abrasive techniques of the sandblasting or water jet type or by techniques of dissolution in alkaline solutions at high temperature and pressure or by thermochemical treatment with a fluorinated gas. This is followed by deoxysulfurization and dealuminization. Finally, on the substrate that is now bare, the combination of underlayer and thermal barrier is deposited anew. The presence of very local damage leads to total reconditioning of the component, with the use of aggressive techniques, which pose risks of damage to the component, reduction in material cross sections and dimensions, which is disadvantageous in the zones with thin walls and with imposed radius of curvature, and finally the use of special, expensive means such as autoclaves, fluorinated gases, etc. Moreover, it is often difficult to remove the entire thermal barrier, especially in the case of deposits by EB-PVD with columnar microstructure optimized for strong adhesion.

For this purpose, FR 2827311 and U.S. Pat. No. 7,008,522 describe a method for repairing thermal barriers. After the usual techniques for preparation of the zone to be repaired by sandblasting, polishing, etc., and for underlayer restoration by deposition of metals by electric current, and formation of the layer of growth oxide, the barrier is restored by EB-PVD. It is then necessary to subject the component to oscillating movements, during EB-PVD deposition, in order to make the repair uniform. This is therefore a complex technique requiring both EB-PVD equipment and special motorized tools.

U.S. Pat. No. 5,723,078 describes a technique for local repair of a thermal barrier by local cleaning of the underlayer of the spalled ceramic and redeposition of a layer of ceramic by plasma spraying. This deposition may be carried out after treatment of the bonding layer by sandblasting, micromachining, photolithography or laser grooving to increase its roughness, as described in EP 0808913, U.S. Pat. No. 7,094,450, US 2004/0219290 and US 2005/0191516. It can also be carried out after removing the spalled layer of ceramic by water jet and then after creating a profile suitable for the deposition of powders, which are sprayed by atmospheric plasma spraying or in HVOF equipment (High Velocity Oxy-Fuel or Supersonic Flame Spraying), see EP 1832668, US 2007/0202269, or by other variants of spraying such as plasma spraying, flame spraying, and wire arc spraying and by blown arc plasma. The ceramic powder may be fed into a torch of the oxyacetylene type, to be sprayed semi-molten onto the part to be repaired, cf. US 2005/0129868. The ceramic powder sprayed may consist of a mixture of powders having a sufficiently low melting point for the phase to be molten at the time of spraying, see US 2005/0003097. The sprayed ceramic deposit may also have a gradient of variable or defined composition between the underlayer and the thermal barrier, as described in US 2011/287191 and WO 2011/144860.

Finally, U.S. Pat. No. 7,115,832 describes a so-called portable device for repairing thermal barriers based on atmospheric arc plasma technology. This method, also called microplasma, consists of a gun equipped with a plasma torch formed between two electrodes and a powder injector under argon as plasma gas. The plasma gun must be cooled with water and protected by a gas, for example argon at 2-8 liters per minute. It can only be used for producing repair strips of small width between 0.5 and 5 mm.

On account of the poor mechanical properties of the lamellar layers obtained by plasma spraying, none of these techniques is applicable for zones that are heavily stressed thermally and mechanically, such as leading edges, the preferential site for spalling by erosion, or the blade face. Moreover, the known spraying equipment has major drawbacks associated with high consumption of energy, of gas and of powders with low efficiency and important environmental drawbacks and exposure of workers to fine powders.

U.S. Pat. Nos. 7,476,703, 6,875,464, US 2004/214938, US 2005/0111903, US 2005/0228098 and 2007/0134408 disclose a repair technique based on a ceramic paste comprising a ceramic material, a binder and a lubricant, deposited on the surface to be repaired and then heated to 700° C. in order to obtain a repair of the vitreous type. The ceramic material generally consists of solid particles of zirconia with solid particles of yttria, and the binder may be based on silicone resin. The particles of ceramic may be nanometric, which makes it possible to have thixotropic behavior of the repair during application.

A variant published in US 2005/0118331 proposes applying a mixture of solid particles of ceramic and hollow spheres of ceramic with a silica precursor binder, followed by thermal treatment. However, the ceramic is injected in solid form, which means it is not possible to fill the small interstices or the existing cracks at the substrate/ceramic interface. With such a method, the repair obtained does not have the microporous morphology necessary for withstanding the strong thermomechanical stresses to which the component, notably the blade, is subjected. In fact, during drying and annealing, the layer applied has a tendency to sinter, which leads to the formation of cracks, defects of adhesion and of desquamation. This method involves powders and hazardous products, certain of which, notably the binder and the lubricant, on decomposing will contaminate the thermal barrier and alter its thermal properties.

US 2010/0247740 describes a technique for repairing thermal barriers based on the principle of depositing, in the zone to be repaired, a wet ceramic carrier film of a material with the composition of the thermal barrier to be repaired. The film may consist of one or more layers, and be infiltrated beforehand by a wet deposit produced by sol-gel or by slip, or "slurry". The temperatures to apply may be between 400 and 2000° C. Various types of thermal barrier can be repaired: zirconia stabilized or partially stabilized with oxides of Ce, Hf, Y, Ca, etc., this does not allow repairs to be effected simply in zones of delamination or of very small size since the films must be cut to the dimensions of the zones to be repaired. Moreover, it is long and expensive, since it is necessary to infiltrate the ceramic film beforehand, and a high annealing temperature is required.

The techniques for repairing thermal barriers by the sol-gel route, cf. U.S. Pat. No. 6,235,352, allow some infiltration in the zones to be repaired that are of difficult access, while leading, however, to insufficient thicknesses. The repair of a thermal barrier typically with a thickness of 100 μm is not conceivable with this type of technique of deposition as a thin layer, as typically the thickness of a layer deposited by the sol-gel route is 0.1 μm. The number of successive layers to be deposited to repair the full thickness of a thermal barrier would be very time-consuming. Solid oxide particles have been added, up to 90 wt %, in the sol-gel solutions, for example in the publications U.S. Pat. No. 5,585,136 and US 2004/0258611 in such a way that the thickness of a deposited layer is greater. If the thickness obtained is then compatible with a method for repairing a thick layer of thermal barrier, the particles introduced are solid and consequently the method has the same disadvantages as those of the spraying techniques. An example is given by L. Pin et al. in "Processing, repairing and cycling oxidation behavior of sol-gel thermal barrier coating" Surface and Coating Technology 206 (2011) 1609-1614, which discloses that the sol-gel process with solid powder fillers leads to nonuniform filling of the cracks.

With the exception of the EB-PVD process, which is sophisticated and is expensive for making repairs, the other techniques for repairing thermal barriers use either injection of solid or molten powders, or a solely liquid route, notably sol-gel, but with efficiency that is incompatible with use.

The work by Rousseau et al. "Deposition of thick and 50% porous YpSZ layer by spraying nitrate solution in a low pressure plasma reactor", Surface and Coating Technology 206 (7) (2011) 1621-1627 proposes providing alumina with a thermal barrier of yttria-stabilized zirconia or YpSZ (Yttria partially Stabilized Zirconia) of thickness 200 μm at 50% porosity with a nanoporous structure and vertical microcracks. However, this technique does not allow deposition of the particles in liquid form, which makes it impossible to repair longitudinal cracks at the substrate/thermal barrier interface.

After carrying out this substantial qualitative review of technologies, the applicant realized that it was desirable to take into account repair of the thermal barrier and of its anti-CMAS layer while avoiding products that are toxic to humans, by reason of the particle size of the powders employed or their chemical nature.

The invention aims to remedy the drawbacks of the above techniques, identified by the applicant. More particularly, the invention proposes a method for controlling the state of the ceramic precursors injected in a low-pressure plasma discharge and hence proceed to local repair of locally damaged thermal barriers by infiltrating firstly the open longitudinal cracks from delamination of the thermal barrier, then by filling the spalled surface zones of larger size. A longitudinal delamination crack may be located beneath the thermal barrier, i.e. between the thermal barrier and the substrate optionally coated with a metallic underlayer or with an oxide film. Another longitudinal delamination crack may be located in the thermal barrier itself.

A method for repairing the thermal barrier of a component comprising a substrate coated with such a thermal barrier, said substrate being made of high-performance alloy, said thermal barrier adhering to the alloy and being of lower thermal conductivity than the alloy, the thermal barrier comprising at least one ceramic, it being necessary to repair a region of the thermal barrier, comprises the following steps:

a) delimiting the region to be repaired, with a mask protecting the other regions of the thermal barrier;

b) injecting a carrier gas loaded with droplets of ceramic precursor into a plasma discharge within a plasma chamber of a plasma reactor containing the component to be repaired while controlling the concentration of ceramic precursor in the carrier gas and at least one parameter of the reactor among: pressure of the plasma chamber, power of the plasma generator, diameter of precursor droplets, to control the state—liquid, gel or solid—of the ceramic precursor impacting the region to be repaired, c) injecting the gas not loaded with ceramic precursor into a plasma discharge within the plasma chamber, steps b) and c) being repeated.

In one embodiment, said concentration increases at each iteration of step b) and said parameter decreases at each iteration of step b) to infiltrate delamination cracks of the thermal barrier and then fill the spalled surface zones of said region.

In one embodiment, the ceramic precursor impacting the component to be repaired is in the liquid state in a first series of steps b), in the gel state in a second series of steps b), and in the solid state in a third series of steps b).

In one embodiment, the method comprises a step of cleaning said region, carried out in the plasma chamber prior to step a), comprising injection of a reducing gas into a plasma discharge.

In one embodiment, the method comprises a step of preparing said region, carried out in the plasma chamber prior to step a), comprising injection of an oxidizing gas into a plasma discharge.

The cleaning step may take place before the preparation step.

In one embodiment, step b) comprises pulsed injections of said carrier gas, with a ratio of injection time to resting time between 1/5 and 1/30.

In one embodiment, steps b) and c) are carried out 6 to 30 times.

In one embodiment, the ceramic precursor comprises at least one among zirconium nitrates or oxynitrates, yttrium nitrates, gadolinium nitrates and europium nitrates, with a concentration between 0.05 and 0.5 mole per liter, with pH between 1.2 and 2 and with electrical conductivity between 0.02 and 0.2 Siemens $cm^{-1}$.

In one embodiment, the ceramic precursor comprises at least one among acetates or chlorides.

In one embodiment, the power of the generator that supplies the electromagnetic waves for creating the plasma is between 60 and 20000 W, preferably between 200 and 10000 W.

In one embodiment, the pressure in the plasma chamber is between 1 and 20000 Pa during steps b) and c), preferably between 100 and 10000 Pa.

In one embodiment, injection is carried out via a capillary with a diameter between 50 and 900 μm.

In one embodiment, the alloy comprises a nickel-based superalloy. The alloy may be single-crystalline for a blade or polycrystalline for a combustion chamber.

In one embodiment, the alloy comprises a cobalt-based superalloy. The alloy may be polycrystalline.

In one embodiment, the thickness of the thermal barrier is between 50 and 300 μm, preferably between 100 and 150 μm.

In one embodiment, the thermal barrier is permeable and contains open pores.

In one embodiment, the thermal barrier is permeable and contains closed pores.

In one embodiment, the thermal barrier comprises at least one element among zirconia, preferably yttria-stabilized or doped with neodymium oxide, gadolinium zirconate, neodymium zirconate and europium zirconate.

In one embodiment, a plasma of low power, for example 0.2 to 20 kW, at negative pressure, for example 10 to 10000 Pa, is created in a reactor in which a solution of ceramic precursors, such as nitrates, oxynitrates, acetates, chlorides or any other liquid organometallic, is introduced using an injector, for example a spray, a jet, a nebulizer, an atomizer, allowing droplets to be produced with a diameter between 100 nm and 2 mm.

In one embodiment, control between the concentration of the ceramic precursors and at least one parameter among the pressure in the plasma chamber, the power of the plasma generator and the system for producing the droplets is employed in order to control the state—liquid, gel or solid—of the particles impacting the component in order to effect repair where the thermal barrier is damaged. The state—liquid, gel or solid—of the impacting particles—at the place and at the moment of impact—is modifiable during the method. For a solution of ceramic precursors, said control may be carried out based on an electrical conductivity cell, measuring the electrical conductivity of the solution, a pH-meter, a probe for measuring the concentration of the solution of ceramic precursors such as an electrode selective for nitrate ions, or else a capillary viscosimeter. Control of production of the droplets is a function of the type of atomizer used. It may be carried out by varying the diameter of the capillary for a pressure atomizer of the liquid type, or the frequency and power of the piezoelectric for a piezoelectric nebulizer. The pressure in the plasma chamber may be controlled by the pumping unit and the power of the plasma generator may be controlled by the controller of the generator. Control between the concentration of the ceramic precursors and a parameter among the pressure of the plasma chamber, the power of the plasma generator and the system for producing the droplets is sufficient for monitoring the liquid, gel or solid state of the particles that repair the damaged thermal barrier.

In another embodiment, finer optimization and improved efficiency are obtained by controlling the concentration of the ceramic precursors for at least two of these parameters, or for the three parameters pressure of the plasma chamber, power of the plasma generator and system for producing the droplets, notably the diameter.

The component to be repaired may be placed in plasma discharge or in plasma post discharge. In discharge, the substrate holder performs the role of counterelectrode. In post discharge, the circuit is closed by a counterelectrode separate from the substrate holder, for example a grounded metal braid. Control will be adapted as a function of the difference in efficiency induced.

In the case of perforated components, in order to avoid depositing ceramic in the holes or cooling channels, the component equipped with holes may be connected to a fluid with a pressure higher than the pressure in the plasma chamber, for example atmospheric pressure, the external air then occupying the cooling channels and blocking deposition of the precursors on these zones. It is also possible to provide a flow of fluid other than air through the perforated component, for example through the hollow fir tree base in the case of a cooled blade.

Ceramic precursor means a chemical object containing at least one element of the ceramic and allowing initiation of a reaction of formation of said ceramic.

The invention makes it possible to perform local repair of new or used thermal barriers by a method with reasonable cost, with low energy consumption and allowing repairing particles in the liquid, gel or solid state to be sent to the surface of the material to be repaired, controllable throughout the process. Moreover, the method makes it possible to perform, within one and the same enclosure, the desirable steps for local repair of the thermal barriers, notably preliminary steps of pickling of the oxides or corrosion products that are not protective, formation of the oxide film (TGO) in the metal parts that have been stripped in order to ensure adhesion of the thermal barrier and deposition of the thermal barrier with its anti-CMAS layer. The thickness of the repair on the damaged zone may be high, roughly equal to that of the original thermal barrier. The products employed are satisfactory for the health of the operators. The microstructure of the repair obtained is microporous and nanoporous with very low thermal conductivity and therefore compatible with the microstructure obtained by EB-PVD or by plasma spraying of the thermal barrier to be repaired.

The method makes it possible to preserve a thermal barrier deposited on a perforated component by avoiding clogging of the holes such as the cooling channels of a blade or the holes of a multiperforated combustion chamber. The method makes it possible to repair, in the same enclosure, the thermal barrier and its anti-CMAS layer—by employing steps carried out within the same enclosure.

The component to be repaired may be permeable with open pores, and the open pores may be supplied with a fluid with pressure above the pressure in the plasma chamber, said fluid then occupying the open pores, blocking deposition of the precursors in the open pores and leaving the open pores free after repair.

Moreover, it is possible to inject—with the ceramic precursors—suspensions, metal alkoxides, colloidal solutions or precursors of compounds comprising ions with particular properties, notably optical, thus making it possible to obtain particular compositions or embed heat sensors in the thermal barrier deposited at the desired depth, use of which is known in the field of thermal diagnostics or nondestructive testing.

Other features and advantages of the invention will become clear on examining the following detailed description, and the appended drawings, in which.

The applicant noticed that a technique derived from fuel cells was interesting. The reader is invited to refer to FR 2729400, which describes a method for depositing a thin layer of metal oxide for a fuel cell. A substrate is placed in a vacuum chamber communicating with a plasma chamber that has a convergent nozzle opening into the vacuum chamber via an outlet orifice arranged opposite the substrate and with a diameter between 2 and 5 mm. The pressure in the vacuum chamber is between 10 and 2000 Pa. A slow flow of a gas comprising at least the element oxygen is injected continuously into the plasma chamber and a plasma is generated in the plasma chamber by electromagnetic excitation of the gas. An aqueous solution containing at least the metallic element is nebulized, thus generating an aerosol in a carrier gas that has a pressure above the pressure prevailing in the vacuum chamber and predetermined amounts of the carrier gas loaded with aerosol are caused to enter the plasma chamber sequentially, by aspiration. Starting from the reactor of this method as the basis, the applicant developed a method for repairing locally damaged thermal barriers.

Figure 1:
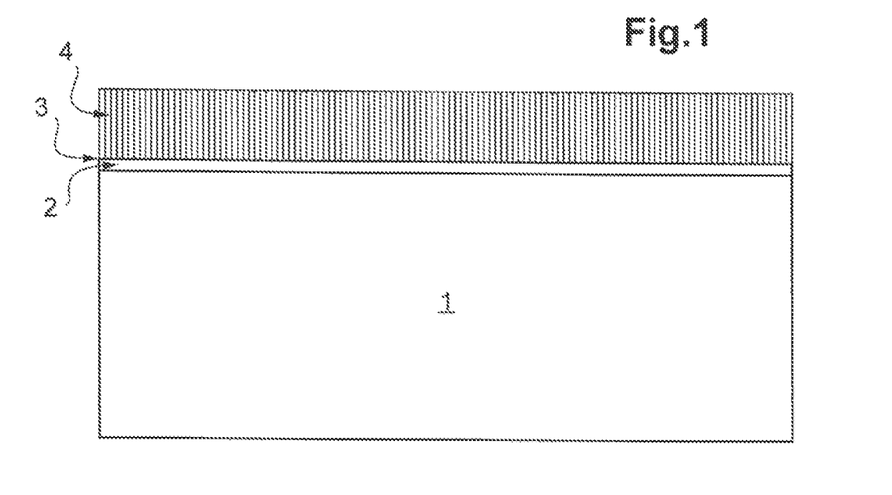
FIG. 1 is a sectional view of a component equipped with a thermal barrier in good condition.

As illustrated in FIG. 1, a component comprises a substrate 1 made of nickel-based superalloy, coated on its outer face with a metallic underlayer 2 of alloy. The metallic underlayer 2 may comprise essentially the elements M, Cr, Al and Y with M denoting iron, cobalt and/or nickel. As a variant, the underlayer comprises nickel aluminide, simple, or modified with a platinum metal, notably Pt, Pd, Ru, Rh, Os, Jr and Re or doped with a reactive element, for example Zr, Hf or Y. The metallic underlayer may alternatively comprise a platinum deposit formed by diffusion. The metallic underlayer 2 comprises an outer face coated with an oxide layer 3. The oxide layer 3 has an outer face coated with the thermal barrier 4.

The thermal barrier may have a thickness between 100 and 150 μm. The thermal barrier 4 may be produced by EB-PVD. The thermal barrier 4 may comprise a zirconium-based oxide partially stabilized with yttria. The oxide layer 3 has a thickness between 0.1 and 1 μm and preferably between 0.3 and 6 μm. The underlayer 2 has a thickness between 10 and 100 μm, preferably between 20 and 50 μm. The underlayer 2 may comprise platinum-modified or zirconium-doped nickel aluminide, cf. U.S. Pat. No. 7,608,301, or a γ-γ' alloy, cf. U.S. Pat. No. 7,273,662 and may itself comprise a diffusion barrier according to U.S. Pat. No. 7,482,039. The underlayer 2 is based on the nickel-based single-crystalline superalloy 1. Alternatively, the oxide layer 3 is based directly on the superalloy as indicated in U.S. Pat. No. 5,538,796.

In operation, the component may suffer degradation connected with thermal shocks, spalling of the outer layer, oxidation of the assembly or interactions with the environment. We then observe, see FIG. 2, deposits of CMAS 5 on the surface, surface zones 7 with severe spalling, in which the underlayer is oxidized or corroded, as well as longitudinal cracks 6 from delamination between the superalloy and the thermal barrier, and within the thermal barrier.

Figure 2:
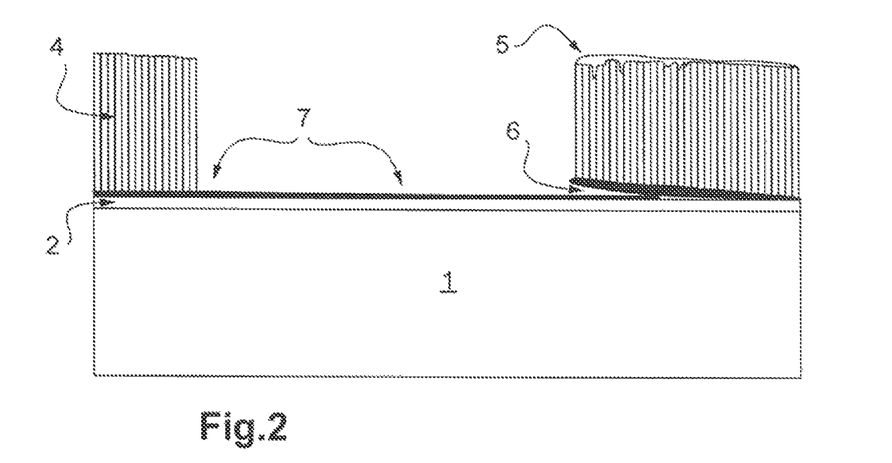
FIG. 2 is a sectional view, enlarged compared to FIG. 1, of a component whose thermal barrier is damaged.

Typically, the component has spalling of some mm$^2$ to some cm$^2$ with numerous longitudinal delamination cracks between the thermal barrier 4 and the substrate 1. The oxide layer 3 has a thickness between 0.3 and 6 μm. The thermal barrier 4 has a columnar structure in this case.

Figure 3:
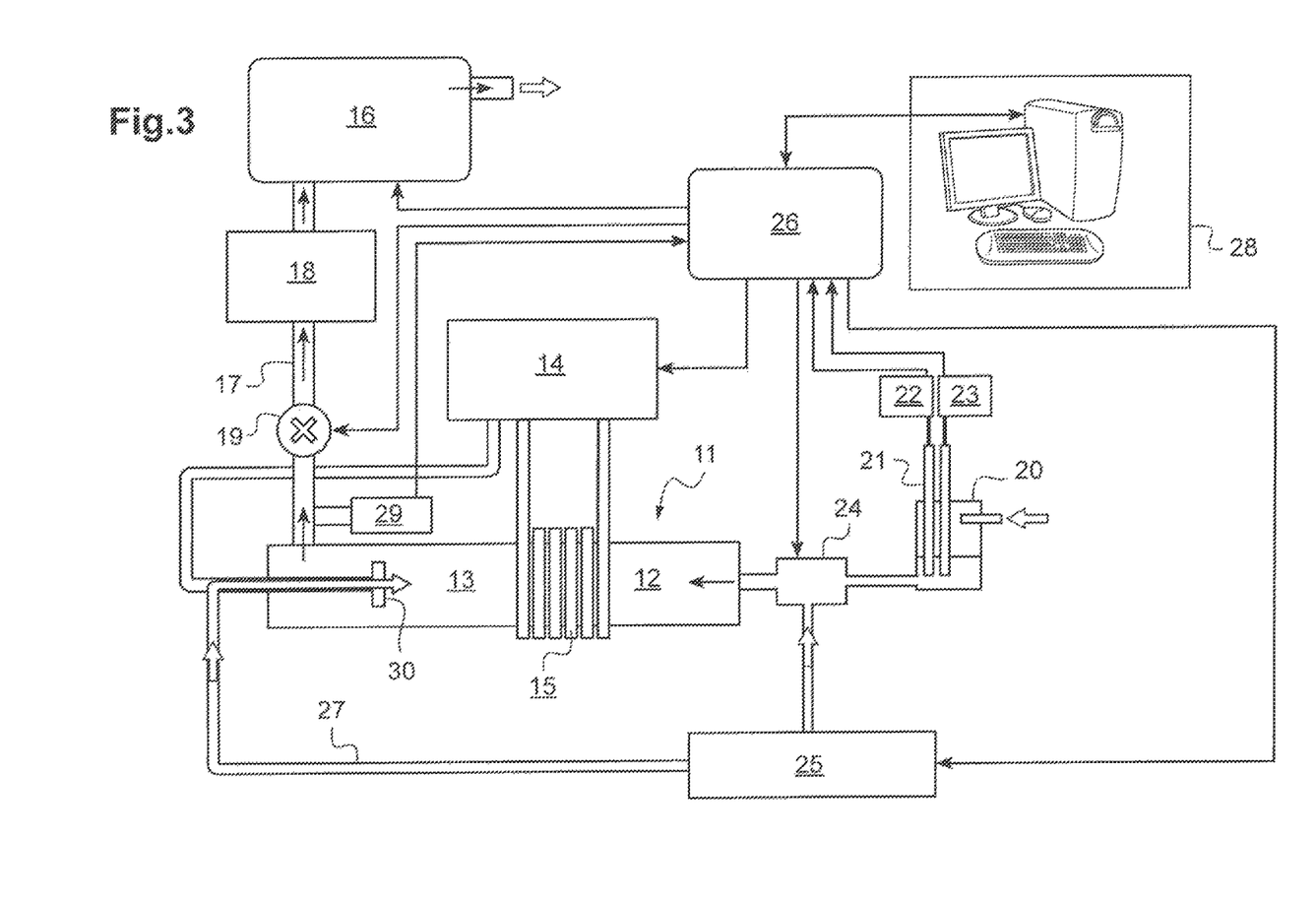
FIG. 3 is a schematic view of equipment for implementing the method.

As can be seen in FIG. 3, the system comprises a reactor 11 equipped with a plasma chamber 12 in which a substrate holder 13 is arranged. The component 30 may be mounted on the substrate holder 13. A radiofrequency generator 14 supplies the induction coil 15 arranged around the plasma chamber 12. The electrical frame of the radiofrequency generator is connected to the substrate holder 13. A vacuum pump 16 is connected by a pipe 17 to the interior of the plasma chamber 12. Filters 18 are provided on pipe 17, allowing capture of the acids and dusts, and at least one controlled valve 19.

At least one container 20 is provided for containing the precursors. Probes 21 of a pH-meter 22 and of a conductivity meter 23 are arranged in the container 20. The container 20 is connected to the plasma chamber 12 via a device for feed of the gases and for injection of the precursors 24, comprising a valve. The feed device 24 is also connected fluidically to a gas distributor 25 equipped with at least a mass flowmeter. The feed device 24 comprises a capillary of fixed or adjustable diameter depending on the requirements or a nebulizer optionally coupled to a valve. A cabinet for control, acquisition and monitoring 26 is connected to outputs of the pH-meter 22 and conductivity meter 23 and to the pressure sensor 29 upstream of the pumping valve 19. The control cabinet 26 comprises control outputs connected to the vacuum pump 16, to the radiofrequency generator 14, to the feed device 24 and to the gas distributor 25. Optionally a pipeline 27 is provided between the gas distributor 25 and the substrate holder 13 and a pressure gauge 31 for supplying gas for keeping open the perforations of the component to be repaired. The cabinet 26 is also in communication with a computer 28 equipped with an acquisition card and stores the data from implementation of control, notably Tables 1 to 3.

After sandblasting of the component directed on the regions to be repaired and masking the sound regions of the thermal barrier, the component is mounted in a low-pressure plasma reactor on a substrate holder.

Negative pressure is established in the plasma chamber. The plasma is generated by plasma discharge in an interelectrode zone. A reducing plasma is then created in order to perform cleaning of the regions to be repaired. The oxide layer that promotes adhesion is then formed with an oxidizing plasma. Then, keeping the plasma oxidizing, the pressure of the plasma chamber and the power of the plasma generator are increased and a solution of hydrated zirconium (IV) oxynitrate $ZrO(NO_3)_2\ 6H_2O$, and optionally of yttrium nitrate $Y(NO_3)_2$, is sprayed via a capillary. The hydrated zirconium (IV) oxynitrate and optionally the yttrium nitrate undergo oxidation. The nitrates reach the substrate in the liquid state and infiltrate the longitudinal delamination cracks of the thermal barrier.

This is followed by a posttreatment step, keeping the plasma gases and the plasma discharge lit. Thus, the hydrated zirconium (IV) oxynitrate, and optionally the yttrium nitrate Y, deposited in and on the substrate, undergo oxidation again.

The injection and posttreatment cycles are repeated from 6 to 30 times so as to infiltrate the longitudinal cracks between the damaged thermal barrier and the substrate, and the open cracks, whether they are within the thermal barrier or are beneath the thermal barrier, and to cover large spalled surface zones.

The invention is in addition illustrated by the following examples.

EXAMPLE 1

The thermal barrier 4 is produced by EB-PVD and comprises a partially stabilized zirconia-based oxide YpSZ. The thickness of the thermal barrier is between 100 and 150 μm. The thermal barrier is on an oxide film about 0.5 μm thick. The oxide film was created in situ during deposition of the thermal barrier.

The underlayer may be of the platinum-modified or zirconium-doped nickel aluminide type. The thickness of the underlayer is between 20 and 50 μm. The underlayer is based on nickel-based single-crystalline superalloy.

Light sandblasting of the component, for example dry sandblasting with corundum, is then carried out in order to descale the zones covered with CMAS, these zones being easy to remove owing to the delamination cracks created by said CMAS deposits, and the nonadherent thermal barrier zones.

The component is then put in a low-pressure plasma reactor and connected to the substrate holder, which may be cooled or heating, fixed or rotating (depending on the complexity of the component to be treated). The sound parts of the component that do not need repair are protected by a mask, for example aluminum foil.

The plasma is generated for example by an induction coil through which a radiofrequency current passes. The frequency of the current may be of the order of 40 MHz. The generator used for supplying this current may be a TOCCO-STEL generator, transferring power between 60 and 600 W to the gas. The generator comprises two parts, one provided with a compartment that creates a high-voltage direct current starting from the three-phase mains current, the other for producing a high-frequency current. For this purpose, the generator is equipped with a triode and comprises an oscillating circuit based on inductances and capacitances. This compartment supplies a high-frequency current to the terminals of the solenoid, which comprises between 5 and 6 turns. The plasma discharge may be capacitive or inductive.

Starting the process comprises switching on the pumping system in order to create negative pressure in the plasma chamber of the reactor. The pressure is monitored by a gauge, for example of the MKSA type. The pumping system makes it possible to create negative pressure in the reactor for controlling the low-power plasma discharge. The generator is then switched on so as to initiate the plasma discharge. A plasma of hydrogen or of argon-hydrogen or of ammonia is then created in order to effect cleaning of the component in the following conditions: power: 200 W, pressure: 560 to 650 Pa, argon flow rate 1.8 liters per minute STP (in standard conditions of temperature and pressure), nitrogen flow rate 0.215 liter per minute STP, hydrogen flow rate 0.1 liter per minute STP, duration 25 minutes. The impurities and compounds with little adherence then having been removed from the region to be repaired, the oxide layer that promotes adhesion is formed. For this purpose, a plasma of argon/nitrogen/oxygen/steam is initiated in the following conditions: power 260 W, pressure 780 to 1000 Pa, argon flow rate 2.1 liters per minute STP, nitrogen flow rate 0.275 liter per minute STP, oxygen flow rate 0.22 liter per minute STP, water flow rate 0.0015 liter per minute STP by 2-minute pulsed injections according to a cycle of opening of the valve of the feed device for 0.2 second and closure of the valve for 2 seconds, the whole for a duration of 90 minutes, recreating the oxide film in the places where it is absent.

Then, maintaining the argon/nitrogen/oxygen plasma in the aforementioned conditions, the pressure of the plasma chamber is increased to 5300 Pa, the power of the plasma generator is increased to 400 W and a solution of hydrated zirconium (IV) oxynitrate and of yttrium nitrate ($ZrO(NO_3)_2$ $6H_2O$ and $Y(NO_3)_2$) of molar ratio 8.5/1 is sprayed via a capillary with a diameter of 500 µm, at a flow rate of 1.5 cm$^3$ per minute, by 2-minute pulsed injections according to a cycle of opening of the valve of the feed device for 0.2 second and closure of the valve for 2 seconds in the plasma discharge. The electrical conductivity and the pH of the injected solution are measured continuously.

During this step, the hydrated zirconium(IV) oxynitrate and the yttrium nitrate are subjected to the action of the oxidizing species O and OH both in flight and on the substrate. The conditions of pressure in the plasma chamber and of power generated by the reactor combined with the size of the droplets produced by the injector mean that the nitrates reach the substrate in the liquid state and are able to infiltrate the longitudinal cracks and the delamination cracks between the substrate and the thermal barrier.

Next is a posttreatment step with a duration of the order of 8 minutes consisting of maintaining the flow rates of plasma gases and maintaining the plasma discharge. Thus, the hydrated zirconium (IV) oxynitrate and the yttrium nitrate that are deposited in and on the substrate are again subjected to the oxidizing chemistry of the discharge, mainly the action of the species O, since the solution is no longer fed in during this step. Moreover, the reactor may also be supplied with water so as to produce OH species during the posttreatment. The temperature at the level of the substrate holder remains below 400° C.

Taking into account the rate of deposition, which is found to be between 15 and 25 µm/h, the injection and posttreatment cycles are repeated 10 times for maximum possible infiltration of the longitudinal cracks, which are notably present between the damaged thermal barrier and the substrate. Then gradually, owing to the control provided between the pumping unit, generator, injector, and the pH measurement or the value of the electrical conductivity of the solution to be injected or both, the pressure in the plasma chamber is decreased, the power of the plasma generator is decreased, the size of the droplets of ceramic precursors is decreased and the concentration of nitrates in the solution is increased. Thus, the precursor droplets pass from the liquid state to a viscous gel state during the intermediate cycles, then solid, allowing covering of large spalled surface zones during the last injection/posttreatment cycles.

At the end of the first 10 cycles of injection/posttreatment, the parameters of pressure in the plasma chamber, power of the plasma generator power, and of the system for injection of the solution of ceramic precursors are controlled, see FIG. 3, as a function of the measurement of electrical conductivity and of pH of the solution of nitrates. The parameters are changed at the start of each injection cycle according to Table 1 given below. This control is provided by adjusting a pumping valve, controlling the generator and for the capillary injector used here, by the diameter of the capillary.

TABLE 1

| No. of the injection/post-treatment cycle (2 min/8 min) | Concentration of nitrates in the solution mol/L | pH | σ: conductivity (S cm$^{-1}$) | Power (W) | Pressure (Pa) Controlled at the start of the cycle | Diameter of the capillary (µm) |
|---|---|---|---|---|---|---|
| 1-10 | 0.06 | 1.73 | 0.033 | 400 | 5300 | 500 |
| 11 | 0.09 | 1.68 | 0.039 | 380 | 5100 | 500 |
| 12 | 0.12 | 1.62 | 0.045 | 360 | 4900 | 500 |
| 13 | 0.15 | 1.57 | 0.057 | 340 | 4700 | 500 |
| 14 | 0.18 | 1.55 | 0.062 | 320 | 4500 | 200 |
| 15 | 0.21 | 1.5 | 0.073 | 300 | 4300 | 200 |
| 16 | 0.24 | 1.47 | 0.081 | 280 | 4100 | 200 |
| 17 | 0.27 | 1.45 | 0.088 | 260 | 3900 | 100 |

TABLE 1-continued

| No. of the injection/post-treatment cycle (2 min/8 min) | Concentration of nitrates in the solution mol/L | pH | σ: conductivity (S cm$^{-1}$) | Power (W) | Pressure (Pa) Controlled at the start of the cycle | Diameter of the capillary (μm) |
|---|---|---|---|---|---|---|
| 18 | 0.29 | 1.43 | 0.096 | 240 | 3700 | 100 |
| 19 | 0.32 | 1.42 | 0.103 | 220 | 3500 | 100 |
| 20 | 0.35 | 1.40 | 0.110 | 200 | 3000 | 100 |

The thermal barrier obtained after the injection/posttreatment cycles has, at reactor outlet, a crystalline structure visible on the diffraction pattern, while the temperature in the plasma discharge remains moderate.

The thermal barrier may finally, optionally, undergo annealing at a temperature between 300 and 1400° C. Annealing may be carried out in the reactor, which is then equipped with a heating substrate holder, or outside, under air or under an atmosphere controlled for gas and pressure.

Annealing makes it possible to remove residual surface traces of nitrates and water. Annealing also gives rise to a process of germination and growth of the grains constituting the layer.

Figure 4:
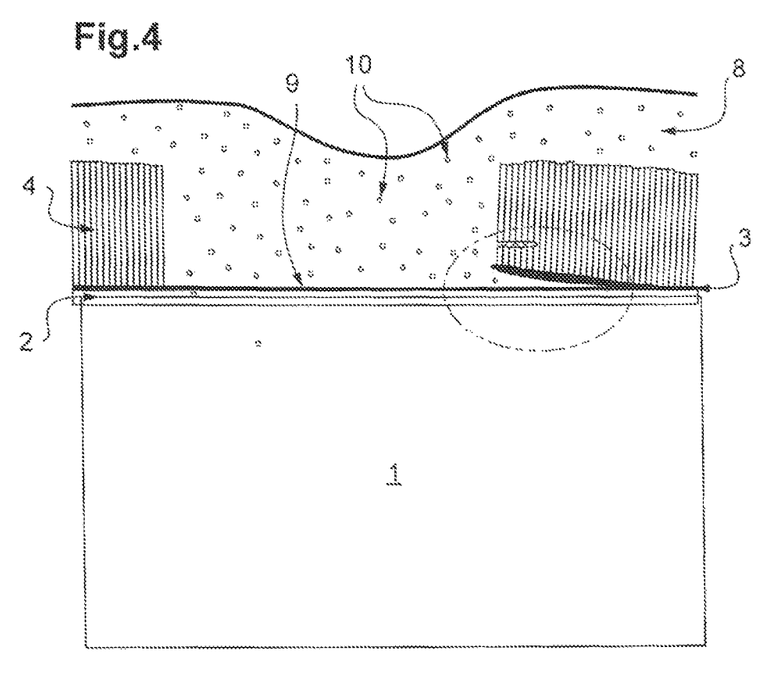
FIG. 4 is a sectional view of a repaired component.
Figure 5:
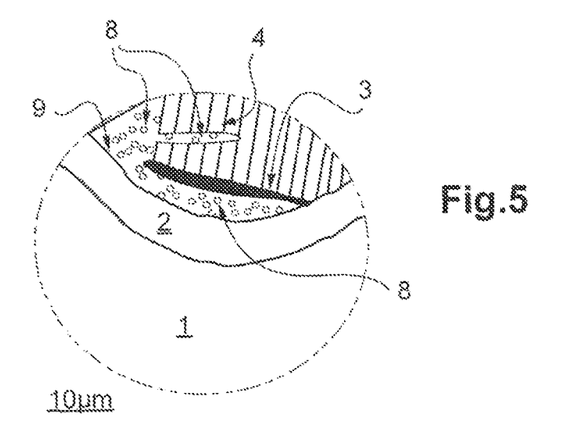
FIG. 5 is a detail view of FIG. 4.

The method makes it possible to obtain, see FIGS. 4 and 5, good local repair of the thermal barrier by recreating an oxide film 9 on the underlayer 2, in the places where the initial thermal barrier 4 and the initial oxide film 3 have become detached, and by infiltrating a new layer of ceramic 8, thus allowing adherence of the initial thermal barrier 4. The new ceramic deposited 8 comprises micropores and nanopores 10. The new layer of ceramic 8 has very low thermal conductivity and is found to have good adhesion to the initial thermal barrier 4 and to the substrate 1. The open longitudinal cracks initially present in the thermal barrier are also filled. Any surplus of ceramic 8 deposited on top of the initial thermal barrier 4 can be removed by light dry sandblasting or polishing.

During the aforementioned steps, the component to be repaired may be connected to a source of external pressure at increased pressure relative to the pressure of the plasma chamber. Thus, a flow of gas, for example of air, comes from the exterior through the perforated component and leaves via the cooling channels, and will thus prevent deposition of the precursors in the holes. A gas other than air may also be used. An operation of repiercing the holes, which is both expensive and relatively risky for component integrity, is thus avoided.

EXAMPLE 2

The procedure as in example 1 is followed, except that no control is provided for the system for injection of the droplets of ceramic precursors. The diameter of the capillaries remains fixed at 500 μm. The control is presented in Table 2.

TABLE 2

| No. of the injection/post-treatment cycle (2 min/8 min) | Concentration of nitrates in the solution mol/L | pH | σ: conductivity (S cm$^{-1}$) | Power (W) | Pressure (Pa) Controlled at the start of the cycle | Diameter of the capillary (μm) |
|---|---|---|---|---|---|---|
| 1-10 | 0.06 | 1.73 | 0.033 | 400 | 5300 | 500 |
| 11 | 0.09 | 1.68 | 0.039 | 380 | 5100 | 500 |
| 12 | 0.12 | 1.62 | 0.045 | 360 | 4900 | 500 |
| 13 | 0.15 | 1.57 | 0.057 | 340 | 4700 | 500 |
| 14 | 0.18 | 1.55 | 0.062 | 320 | 4500 | 500 |
| 15 | 0.21 | 1.5 | 0.073 | 300 | 4300 | 500 |
| 16 | 0.24 | 1.47 | 0.081 | 280 | 4100 | 500 |
| 17 | 0.27 | 1.45 | 0.088 | 260 | 3900 | 500 |
| 18 | 0.29 | 1.43 | 0.096 | 240 | 3700 | 500 |
| 19 | 0.32 | 1.42 | 0.103 | 220 | 3500 | 500 |
| 20 | 0.35 | 1.40 | 0.110 | 200 | 3000 | 500 |

At the level of the repaired zone, we obtain results very similar to those obtained in example 1, namely good infiltration of the deposited ceramic and good adhesion between the initial thermal barrier 4 and the newly deposited ceramic 8. The total thickness of the ceramic 8 deposited is slightly less.

With control on two parameters, pressure in the plasma chamber and power of the plasma generator, instead of three, pressure in the plasma chamber, power of the plasma generator and injection system, control is coarser and the last cycles in which good efficiency is obtained with a solid state of the ceramic precursors are less optimized.

EXAMPLE 3

The procedure in example 1 is followed except that the component is covered with a plasma-sprayed thermal barrier, for example a multiperforated combustion chamber. Conventionally, such a combustion chamber has large spalled zones several cm$^2$ in area with delamination cracks. The component to be repaired may be connected to the external pressure, either with underpressure or with overpressure relative to the external pressure while being at overpressure relative to the pressure of the plasma chamber.

At the level of the repaired zone, we obtain results very similar to those obtained in example 1, notably good infiltration of the deposited ceramic 8 and good adhesion between the initial thermal barrier 4 and the newly deposited ceramic 8. After repair, the multiperforation holes of the combustion chamber remain open and no operation of repiercing is necessary.

For this example, the table for control of the composition of the solution to be injected, of the pressure in the plasma chamber, of the power of the plasma generator and of the injection system is as follows:

TABLE 3

| No. of the injection/post-treatment cycle (2 min/8 min) | Concentration of nitrates in the solution mol/L | pH | σ: conductivity (S cm$^{-1}$) | Power (W) | Pressure (Pa) Controlled at the start of the cycle | Diameter of the capillary (μm) |
|---|---|---|---|---|---|---|
| 1-10 | 0.06 | 1.73 | 0.033 | 400 | 5300 | 500 |
| 11 | 0.09 | 1.68 | 0.039 | 380 | 4800 | 500 |
| 12 | 0.12 | 1.62 | 0.045 | 360 | 4300 | 500 |
| 13 | 0.15 | 1.57 | 0.057 | 340 | 3800 | 500 |
| 14 | 0.18 | 1.55 | 0.062 | 320 | 3300 | 200 |
| 15 | 0.21 | 1.5 | 0.073 | 300 | 2800 | 200 |
| 16 | 0.24 | 1.47 | 0.081 | 280 | 2300 | 200 |
| 17 | 0.27 | 1.45 | 0.088 | 260 | 1800 | 100 |
| 18 | 0.29 | 1.43 | 0.096 | 240 | 1300 | 100 |
| 19 | 0.32 | 1.42 | 0.103 | 220 | 1000 | 100 |
| 20 | 0.35 | 1.40 | 0.110 | 200 | 700 | 100 |

EXAMPLE 4

The procedure in example 1 or 3 is followed, but adding, after the sequences of injection/posttreatment of a solution of hydrated zirconium (IV) oxynitrate and of yttrium nitrate for repairing the thermal barrier, sequences of injection of ceramic precursors of composition called anti-CMAS such as gadolinium zirconate $Gd_2Zr_2O_7$ or neodymium zirconate or a zirconia doped with neodymium oxide in order to create an anti-CMAS layer.

The precursors are for example $ZrO(NO_3)_2.6H_2O$ and $Gd(NO_3)_3.6H_2O$ to form gadolinium zirconate. Results are obtained roughly identical to those in example 1, namely good repair with good infiltration and on the surface, a $Gd_2Zr_2O_7$ ceramic that is microporous and nanoporous yet has good adhesion.

EXAMPLE 5

The procedure as in examples 1 or 3 is followed, but the sequences of injection/posttreatment of a solution of hydrated zirconium (IV) oxynitrate and of yttrium nitrate are replaced with sequences of injection/post-treatments of other thermal barrier precursors. It is thus possible to inject ceramic precursors of so-called anti-CMAS composition such as $ZrO(NO_3)_2.6H_2O$ and $Gd(NO_3)_3.6H_2O$ precursors of $Gd_2Zr_2O_7$ or precursors of zirconia doped with neodymium oxide. Local repair of the initial thermal barrier is then performed with a ceramic of anti-CMAS composition comprising micropores and nanopores. This anti-CMAS composition gives very low thermal conductivity and is therefore very suitable for thermal barrier repair. The anti-CMAS composition has good adhesion to the substrate and to the initial thermal barrier 4 consisting of zirconia partially stabilized with yttria.

EXAMPLE 6

The procedure as in examples 1 or 3 is followed, but injecting a solution with a composition that varies during the cycles of injection/post-treatment. For example, a solution of $(ZrO(NO_3)_2.6H_2O$ and $Y(NO_3)_2)$, precursors of yttria-doped zirconia, is injected in the first ten cycles. The concentration of these precursors is gradually adjusted, adding $Gd(NO_3)_3.6H_2O$ precursor of gadolinium zirconate $Gd_2Zr_2O_7$, while maintaining a total concentration that is compatible with control. During the last injection/posttreatment cycles, the concentration of yttrium nitrate is gradually brought back to zero, and the other two precursors remain.

Good repair of the damaged thermal barrier 4 is obtained with a ceramic that has a composition gradient: from the composition $Zr_2O_3$, $Y_2O_3$ in the vicinity of the substrate 1 of nickel-based superalloy, to the composition $Gd_2Zr_2O_7$ on the external surface. The microporous and nanoporous structure of the deposited ceramic 8 is barely affected by the composition or by the composition gradient.

EXAMPLE 7

The procedure as in examples 1 or 3 is followed, but injecting a solution of ceramic precursors of a particular composition during the first ten cycles of injection/post-treatment. The purpose of said solution of ceramic precursors is to introduce, for example, compounds possessing particular properties at the interface between the oxide film 9 and the thermal barrier deposited 8. It may for example be a solution of $Eu(NO_3)_3.6H_2O$ and $ZrO(NO_3)_2.6H_2O$ precursors of europium zirconate $Eu_2Zr_2O_7$ or of yttria-stabilized zirconia doped with europium or a solution of $Eu(NO_3)_3.6H_2O$, $ZrO(NO_3)_2.6H_2O$ and $Gd(NO_3)_3.6H_2O$ precursors of gadolinium zirconate doped with europium. These compounds possessing ions with a particular optical property may be used for verifying the stress state of the repaired zone in the context of nondestructive testing. We thus obtain, besides good repair of the damaged barrier with a ceramic, ease of control owing to the sensors near the substrate 1 of the component. The microporous and nanoporous structure of the ceramic deposited is barely affected by the composition of this special layer.

Depending on the requirements, this special solution of ceramic precursors may be injected during cycles of injection/post-treatment other than the first ten. They may also be ceramic precursors mixed with suspensions, colloids or metal alkoxides in order to obtain specific properties locally.

EXAMPLE 8

The procedure as in the preceding examples is followed, but with another device for creating the plasma, which comprises a device for generating and transporting the microwave energy and a device for coupling with the flow, for example an atomizer.

The microwave energy created by two microwave generators in pulsed mode at 2.45 GHz, of the SAIREM GMP 20 KE/D type with power adjustable from 200 to 10000 W each stabilized at ±0.1%, positioned opposite. The microwave energy is injected along a diameter of the quartz tube by two waveguides. The device also comprises two impedance adapters, interfaces for computer control and devices for measuring reflected power.

Coupling with the gas is effected in a cylindrical exciter made of stainless steel cooled by circulation of water in a double jacket and placed around a flanged quartz tube in which the plasma is created, cooled for example with air. Flanges are provided, connected to the subassembly allowing injection of the precursors and to the device heating the substrate. The substrate holder may be cooled or heating and used in static or rotating configuration.

The working pressure in the plasma chamber is from 1 to 20000 Pa, with a maximum flow rate of the gases of about 12 liters per minute STP, including 5 liters per minute STP of oxygen and 7 liters per minute STP of argon.

With control between the concentration of the solution of ceramic precursors to be injected, the pressure in the plasma chamber, the power of the microwave generators and the injection system, satisfactory results are obtained.

The invention claimed is:

1. A method for repairing the thermal barrier of a component comprising a substrate coated with such a thermal barrier, said substrate being made of an alloy, said thermal barrier adhering to the alloy and being of lower thermal conductivity than the alloy, the thermal barrier comprising at least one ceramic, it being necessary to repair a region of the thermal barrier, comprising the following steps:
   a) delimiting the region to be repaired, with a mask protecting the other regions of the thermal barrier;
   b) injecting a carrier gas loaded with droplets of ceramic precursor into a plasma discharge within a plasma chamber of a plasma reactor containing the component to be repaired while controlling the concentration of ceramic precursor in the carrier gas and at least one parameter of the reactor among: pressure of the plasma chamber, power of the plasma generator, diameter of precursor droplets, to control the state of the ceramic precursor impacting the region to be repaired,
   c) injecting a gas not loaded with ceramic precursor into a plasma discharge within the plasma chamber,
   steps b) and c) being repeated, and
   wherein the concentration increases at each iteration of step b) and the parameter decreases at each iteration of step b) to infiltrate delamination cracks of the thermal barrier and then fill the spalled surface zones of said region.

2. The method as claimed in claim 1, comprising a step of cleaning said region, carried out in the plasma chamber prior to step a), comprising injection of a reducing gas into a plasma discharge.

3. The method as claimed in claim 1, comprising a step of preparing said region, carried out in the plasma chamber prior to step a), comprising injection of an oxidizing gas into a plasma discharge.

4. The method as claimed in claim 1, in which a cleaning step takes place before a preparation step.

5. The method as claimed in claim 1, in which step b) comprises pulsed injections of said carrier gas, with a ratio of injection time to resting time between 1/5 and 1/30.

6. The method as claimed in claim 1, in which steps b) and c) are carried out 6 to 30 times.

7. The method as claimed in claim 1, in which the ceramic precursor comprises at least one among hydrated zirconium (IV) oxynitrate, yttrium nitrates, gadolinium nitrates and europium nitrates, with a concentration between 0.05 and 0.5 mole per liter, with pH between 1.2 and 2 and with electrical conductivity between 0.02 and 0.2 Siemens cm$^{-1}$.

8. The method as claimed in claim 1, in which the power of the plasma discharge is between 60 and 20000 W.

9. The method as claimed in claim 1, in which the pressure in the plasma chamber of the plasma reactor is between 1 and 20000 Pa during steps b) and c).

10. The method as claimed in claim 1, in which injection is carried out via a capillary with a diameter between 50 and 900 μm.

11. The method as claimed in claim 1, in which the alloy comprises a superalloy with a base selected from at least one of nickel and cobalt.

12. The method as claimed in claim 1, in which the thickness of the thermal barrier is between 50 and 300 μm.

13. The method as claimed in claim 1, in which the thermal barrier is permeable.

14. The method as claimed in claim 1, in which the component to be repaired is permeable with open pores, the open pores being supplied with a fluid with a pressure above the pressure in the plasma chamber, said fluid then occupying the open pores, blocking deposition of the precursors in the open pores and leaving the open pores free after repair.

15. The method as claimed in claim 1, in which the thermal barrier comprises at least one among zirconia, preferably yttria-stabilized or doped with neodymium oxide, gadolinium zirconate, neodymium zirconate and europium zirconate.

16. The method as claimed in claim 1, wherein the ceramic precursor is in a liquid, gel, or solid state.

* * * * *